United States Patent [19]

Wu

[11] Patent Number: 4,586,221

[45] Date of Patent: May 6, 1986

[54] UNIVERSAL CLAMPING DEVICE FOR DIAL INDICATORS

[76] Inventor: Chun-San Wu, 6F-3, No. 363, Fuhsing Rd. Sec 3, Taichung, Taiwan

[21] Appl. No.: 675,749

[22] Filed: Nov. 28, 1984

[51] Int. Cl.$^4$ ............................................. A44B 21/00
[52] U.S. Cl. ....................................... 24/535; 24/542; 24/545; 248/DIG. 4; 248/DIG. 12
[58] Field of Search ............... 24/535, 542, 543, 545, 24/293; 248/DIG. 4, DIG. 12

[56] References Cited

U.S. PATENT DOCUMENTS

| | | | |
|---|---|---|---|
| 575,779 | 1/1897 | Homan | 248/DIG. 12 |
| 1,398,519 | 11/1921 | Hosch | 248/DIG. 12 |
| 1,486,908 | 3/1924 | Lowe | 248/DIG. 4 |
| 2,447,624 | 8/1948 | Akert | 248/DIG. 4 |
| 2,458,670 | 1/1949 | Young, Jr. | 24/535 |
| 2,469,904 | 5/1949 | Szuba | 248/DIG. 4 |
| 3,210,816 | 10/1965 | Clemons | 24/535 |
| 3,866,473 | 2/1975 | Teitelbaum et al. | 24/535 |
| 3,999,340 | 12/1976 | Bogese et al. | 24/535 |

*Primary Examiner*—Victor N. Sakran
*Attorney, Agent, or Firm*—Holman & Stern Chartered

[57] ABSTRACT

A clamping device for use in clamping dial indicators and like instruments used in surveying comprises a bifurcated clamping element having a pair of elongate arms defining a central slot. The arms define a pair of circular openings at the base of the slot, a large circular opening midway up the slot, and rebates defining a seat for a dovetail key at the end of the slot. An adjustment screw is provided between the arms for tightening of same. A variety of split sleeve inserts having different internal diameters may be used in the large circular opening for receipt of different size instruments.

3 Claims, 3 Drawing Figures

UNIVERSAL CLAMPING DEVICE FOR DIAL INDICATORS

BACKGROUND OF THE INVENTION

This invention relates to a universal clamping device for dial indicators, dial test indicators, micrometers and like instruments as used more particularly in surveying work.

Most dial indicators in current use have a flat base with a hole in the center which in use is attached by a sleeve on a bolt during survey work. The currently used dial indicators have different specifications in the British and metric systems while most of their shapes include a straight rod and the like. The distinctions lie in the different sizes of the rod and these generally fall within four specifications, namely 8 millimeters, 5/16th inch, ¼th inch and 5/32nd inch. Conventional clamping devices for such indicators are generally designed to accept only the specific size indicator for which the clamp device is designed and cannot accept other sizes. Accordingly, they are inconvenient in use.

It is an object of the present invention to overcome the above defects in current clamp devices by providing a universal clamping device for dial indicators, and dial test indicators and the like.

BRIEF SUMMARY OF THE INVENTION

A universal clamping device for dial indicators and the like comprises a bifurcated holding member having a pair of arms defining a central slot. The base of the slot includes a pair of side-by-side cylindrical openings, and intermediate its length the slot includes a larger circular opening for receipt of a clamping sleeve, the ends of the slot defining rebated portions for receipt of a corresponding dovetail mount on a dial indicator or like instrument. A tightening screw is connected across the arms between the pair of cylindrical openings and the larger cylindrical opening.

The clamping device accordingly can receive different size circular rods by including different sized sleeves in the larger circular opening and it can also receive dovetail mounting plates.

DESCRIPTION OF PREFERRED EMBODIMENT

Figure 2:
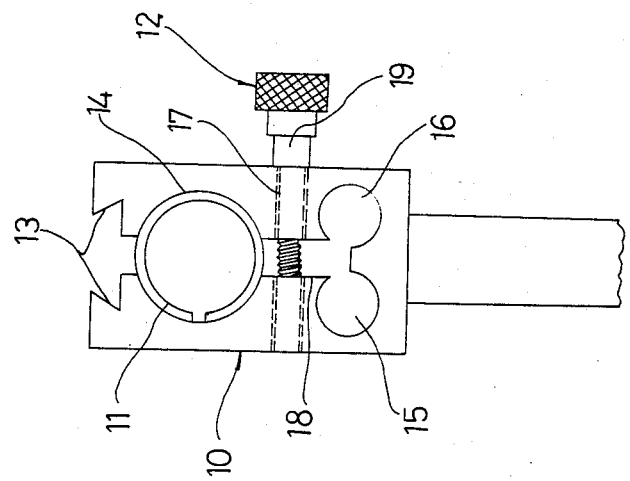
FIG. 2 is a front elevational view of a clamping device in accordance with the present invention.
Figure 1:
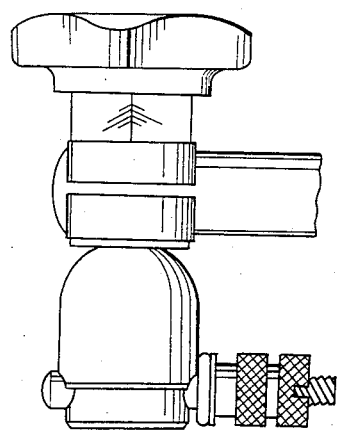
FIG. 1 is a plan view of a clamping base of conventional form with a dial indicator.
Figure 3:
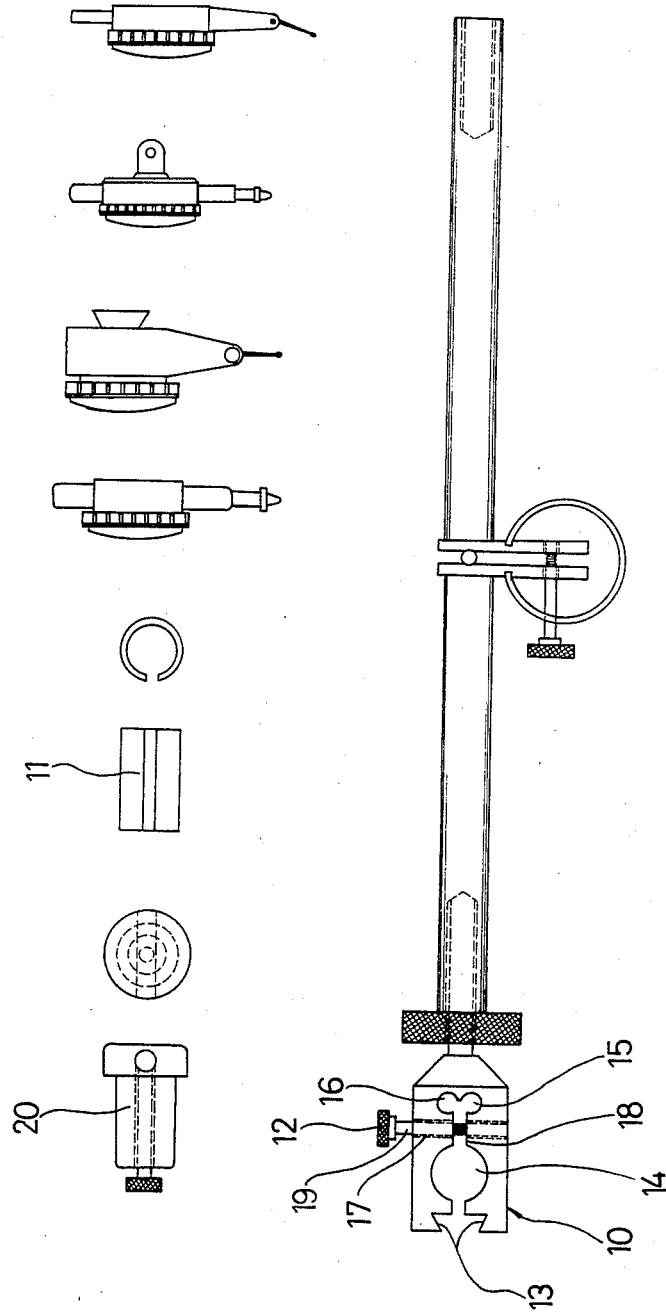
FIG. 3 is an end view of the clamping device in use.

The inventive clamping device comprises a bifurcated base member 10, an open liner sleeve 11, a bolt 12 and a T-cylinder 20.

Rebates 13 defining a dovetail slot are provided at the outer ends of the respective arms of the base member 10 to match and fix dial test indicators which are provided with dovetail keys. Further down the arms, they define a through hole 14 into which liner sleeves 11 of selected internal diameter can be fitted. The liner sleeves are suitably resilient due to their open form and the outer diameter conforms with the diameter of hole 14 while the inner diameter of the respective separate liners may have different sizes such as 8 millimeters, 5/16th of an inch, ¼th inch and 5/32nd of an inch or the like to match appropriately sized rods of various dial indicators so as to firmly clamp same in opening 14. Further, the T-shaped cylinder 20 can be inserted in hole 14 without the use of a liner sleeve.

Round holes 15 and 16 are provided on opposite sides of member 10 at the base of slot 18 and an adjustment screw 17 is provided in a threaded through bore for tightening the arms. The screw 17 has a knurled head 12 and an interposed bearing sleeve 19.

It will be appreciated that the illustrated clamping device provides selective mounting for a variety of dial indicators and the like.

I claim:

1. A clamping device for dial test indicators and like instruments comprising a bifurcated member defining a pair of arms separated by a central elongate slot, said arms defining a pair of adjacent circular openings at the base of the slot, a larger central circular opening intermediate the length of the slot, and rebates at the end of the slot defining a receiver for a dovetail key, the device further including an adjustment screw in threaded bores connecting said arms intermediate the base of the slot and said larger diameter opening.

2. The invention of claim 1 including a plurality of split liner sleeves for receipt in the larger opening, each liner sleeve having a different internal diameter.

3. The invention of claim 1 including a bearing sleeve interposed between an outer surface of the clamping member and a head of the adjustment screw.

* * * * *